United States Patent [19]
Dragoset, Jr.

[11] Patent Number: 4,739,858
[45] Date of Patent: Apr. 26, 1988

[54] SPECTRALLY-SHAPED AIR GUN ARRAYS

[75] Inventor: William H. Dragoset, Jr., Houston, Tex.

[73] Assignee: Western Atlas International, Inc., Houston, Tex.

[21] Appl. No.: 20,549

[22] Filed: Mar. 2, 1987

[51] Int. Cl.$^4$ .......................... G01V 1/38; G01V 1/08
[52] U.S. Cl. ........................................ 181/115; 367/24
[58] Field of Search ..................... 367/15, 23, 24; 181/107, 110, 111, 115

[56] References Cited

U.S. PATENT DOCUMENTS

| | | | |
|---|---|---|---|
| 3,304,533 | 2/1967 | Huckabay et al. | 367/15 X |
| 3,332,512 | 7/1967 | Sundt | 181/0.5 |
| 3,351,899 | 11/1967 | Luehrmann et al. | 340/7 |
| 3,601,216 | 8/1971 | Mott-Smith | 181/115 |
| 3,602,878 | 8/1971 | Sullivan | 340/7 R |
| 3,687,218 | 9/1972 | Ritter | 181/0.5 FS |
| 3,893,539 | 7/1975 | Mott-Smith | 181/115 |
| 4,217,571 | 8/1980 | Hughes et al. | 367/37 |
| 4,300,653 | 11/1981 | Cao et al. | 181/107 |
| 4,316,266 | 2/1982 | Barbier et al. | 367/21 |
| 4,441,174 | 4/1984 | Ray et al. | 367/23 |
| 4,458,339 | 7/1984 | Wason | 367/14 |
| 4,467,459 | 8/1984 | Currie | 367/21 |
| 4,486,864 | 12/1984 | Ongkeihong et al. | 181/107 X |
| 4,493,061 | 1/1985 | Ray | 367/23 |
| 4,599,712 | 7/1986 | Chelminski | 367/144 |

Primary Examiner—Thomas H. Tarcza
Assistant Examiner—Tod Swann
Attorney, Agent, or Firm—E. Eugene Thigpen

[57] ABSTRACT

The invention is a method of shaping the spectrum of a seismic source signature. Energy is concentrated in the range below a selected frequency and attenuated in the range above the selected frequency by activating a plurality of sources asynchronously within a time window of selected duration. In a preferred embodiment, the frequency spectrum is smoothed by firing a second plurality of sources within a second time window having a time delay from the first time window equal to substantially the time between the initial firing of a source and the first positive zero-crossing of the signature.

9 Claims, 3 Drawing Sheets

TIME (MILLISECONDS)

SPECTRALLY-SHAPED AIR GUN ARRAYS

BACKGROUND OF THE INVENTION

1. Field of the Invention

This invention relates to seismic sources and more specifically to methods for controlling the signature of a marine seismic source.

2. Discussion of the Prior Art

To obtain information on substrata located below a body of water, seismic sources adapted for generating an acoustic signal in the water are towed through the water by towing vessels. The acoustic signal generated in the water travels in all directions, and part of this acoustic energy, after having been reflected or refracted by the substrata, returns to the body of water overlying the substrata and is detected by the hydrophones of a detector cable that is towed through the water in the neighborhood of the seismic source.

The marine sources most commonly used today are impulsive sources such as the air gun. Air guns, which generate an acoustic wave by the sudden release of a compressed gas into the water, also generate a train of bubble pulses. When the compressed gas is released from the air gun, a gas bubble expands outwardly from the source until the pressure inside the bubble reduces to the point that the hydrostatic pressure of the water causes the bubble to contract. This contracton of the air bubble increases the air pressure within the air bubble again until the internal air bubble pressure exceeds the hydrostatic pressure and the bubble again expands, thereby causing a secondary acoustic wave called a bubble pulse. Normally, a series of these bubble pulses will be emitted.

Use a single impulsive source, or a plurality of substantially identical sources fired simultaneously, results in a seismic signal whose frequency spectrum exhibits peaks and notches related to the bubble pulse oscillation period. FIG. 2A illustrates the signature from such a plurality of substantially identical sources and FIG. 2B shows the corresponding frequency spectrum of that signature.

It is a common practice in the industry to utilize an array of air guns of different sizes with different oscillation periods in order to produce a seismic signal having a flatter frequency spectrum. A typical signature from such a "tuned" array is shown in FIG. 3A, and its frequency spectrum is shown in FIG. 3B.

Although a broadband frequency spectrum such as shown in FIG. 3B is generally considered desirable, in some areas a seismic signal having energy concentrated in a selected frequency range would be more useful. In some offshore regions, the higher fequencies do not penetrate to the depths of interest, but instead are trapped in the water and near-surface earth layers. Such trapped energy creates strong multiples that obscure the useful signals from lower layers.

It is an object of this invention to generate a seismic source signal whose frequency content is concentrated in the range below a selected frequency. It is also an object of this invention to smooth the frequency spectrum of the signal.

SUMMARY OF THE INVENTION

The invention is a method of shaping the spectrum of a seismic source signature. Energy is attenuated in the range above a selected frequency by activating a plurality of sources asynchronously within a time window of selected duration. In a preferred embodiment, the frequency spectrum is smoothed by firing a second plurality of sources within a second time window having a time delay from the first time window equal to substantially the time between the initial firing of a source and the first positive zero-crossing of the signature.

In a preferred embodiment the sources are selected to concentrate the energy at a selected frequency. In a preferred embodiment, the sources fixed within a given time interval are fired individually at substantially uniform time intervals.

BRIEF DESCRIPTION OF THE DRAWINGS

A more complete understanding of this invention may be gained from the appended detailed description and the drawings, wherein.

DESCRIPTION OF THE PREFERRED EMBODIMENT

Figure 1:
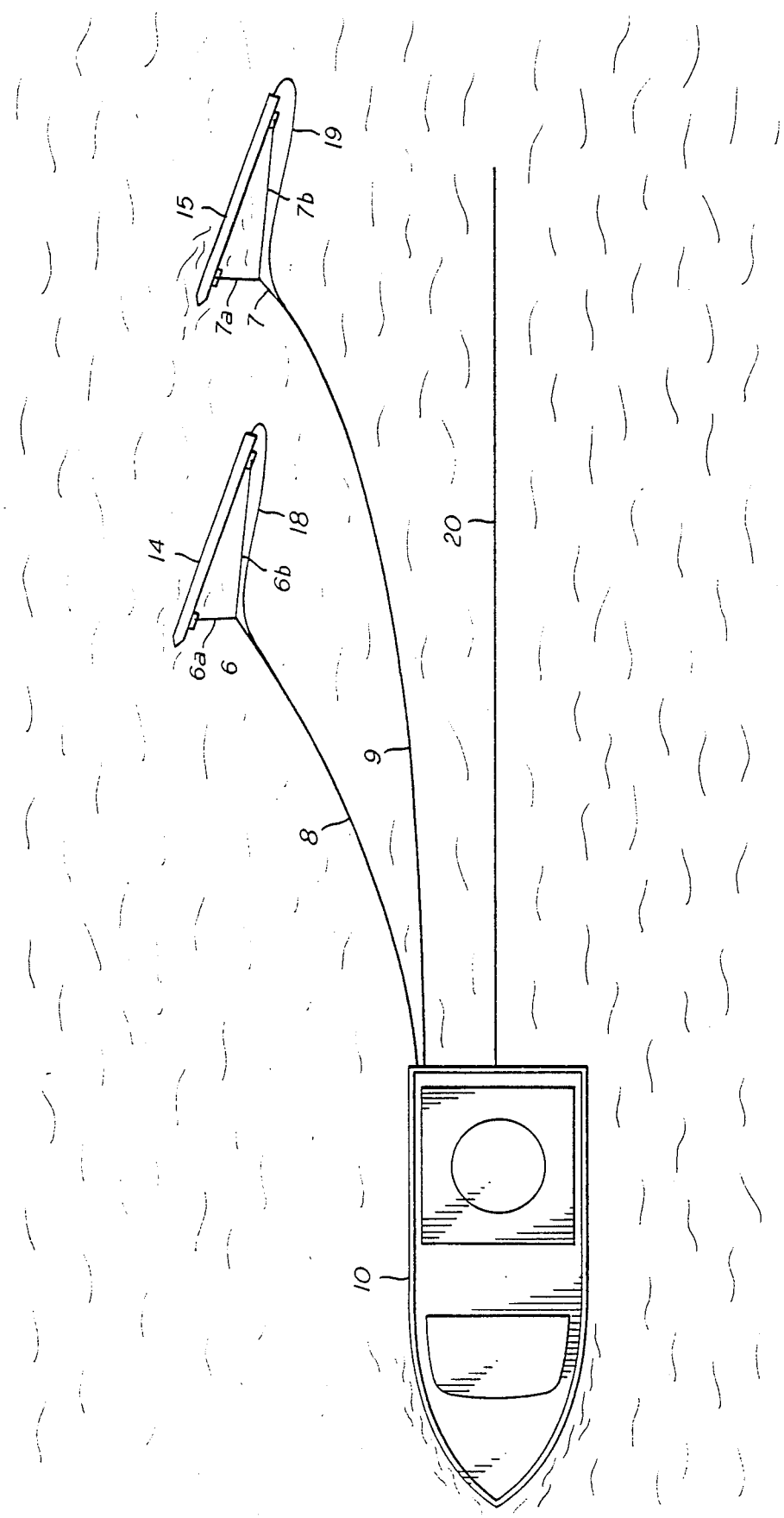
FIG. 1 shows a typical marine seismic exploration system for utilizing the invention.

In marine seismic surveying, it is normal for a seismic vessel to track along a predetermined course on the surface of a body of water, normally the sea. An energy source is towed by the vessel for imparting acoustic signals downwardly into the water. The most frequently used marine source is the air gun and the preferred embodiment will be described with reference to air guns. However, other impulsive sources, such as sleeve exploders as described in U.S. Pat. No. 3,480,101, may be utilized in practicing the invention. A streamer cable, along which are located a plurality of hydrophone arrays or detectors for receiving the seismic reflection, is also towed behind the vessel. Such a system is shown in FIG. 1, in which vessel 10 is shown towing streamer cable 20 and floats 14 and 15. As shown in FIG. 1, integrated towing cable 8 includes a stress member 6 which bifurcates into two sections 6a and 6b which may be attached to float 14 by any suitable coupling means. If desired, stress member 6 may be coupled directly to the float at a single point. Similarly, integrated towing cable 9 includes stress member 7 which bifurcates into segments 7a and 7b which are coupled to float 15. Cable portion 18 comprises the electrical control lines and hydraulic lines which are included in integrated cable 8, and which supply compressed air and control signals to the air guns (not shown) deployed by float 14. Similarly, cable portion 19 cmprises the electrical control lines and hydraulic lines which are included in integrated cable 9, and which supply compressed air and control signals to the air guns deployed by float 15. A marine seismic surveying system might include only one flaot or a plurality of floats greater than two. The floats are utilized for suspending the marine seismic sources (not shown) in the water. Two floats are shown because, in a preferred embodiment of the invention, eighteen sources are included in the source array, and nine sources may be conveniently deployed with a single float. Typically, a float may be configured to act as a paravane so that the float will maintain a desired orientation with respect to the towing vessel and other floats which may be towed behind the vessel.

Figure 2A:
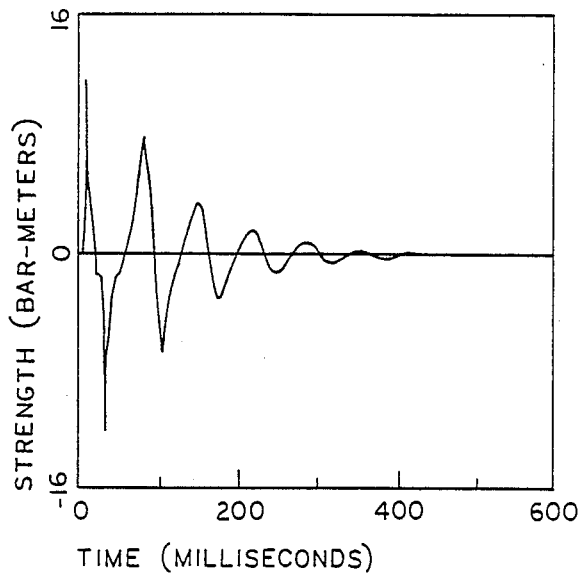
FIG. 2A shows a typical signature generated by a plurality of substantially identical air guns fired simultaneously.
Figure 2B:
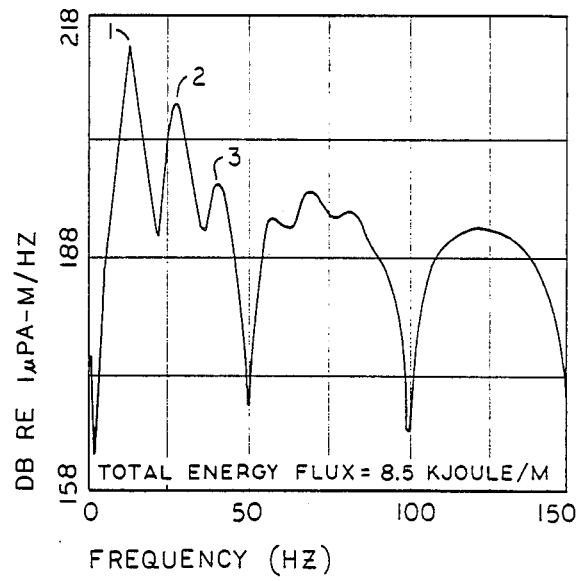
FIG. 2B shows the frequency spectrum of the signal generated by a plurality of substantially identical air guns fired sumultaneously.

FIG. 2A is a computer generated signature of six 100 cubic inch air guns fired simultaneously at a water depth of 15 meters, with an initial air pressure of 4500 pounds per square inch. The size of an air gun, the depth of the air gun in the water and the initial air pressure will all affect the signature of an air gun. These effects are well understood in the industry and will not be discussed herein. FIG. 2B shows the frequency spectrum corresponding to the signature shown in FIG. 2A. The energy is concentrated at the frequency of the bubble pulse oscillations and the harmonics thereof. Notches in the frequency spectrum, such as shown in FIG. 2B are normally regarded as undesirable. (The ordinate scale in FIGS. 2B, 3B and 4B is in dB relative to 1 micropascal, measured at a distance of 1 meter, per Hertz).

Figure 3A:
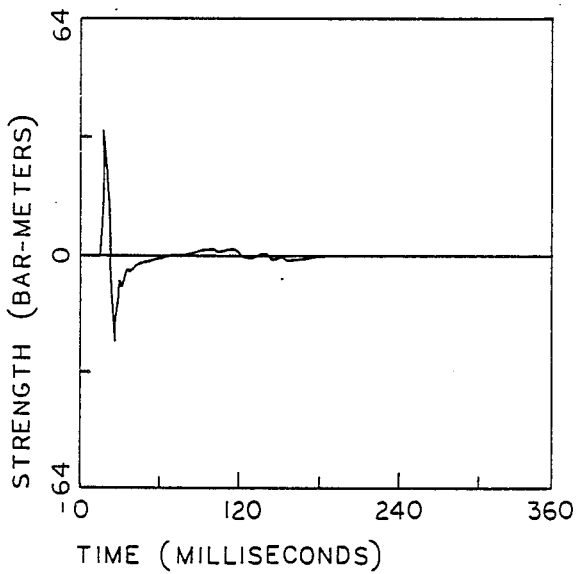
FIG. 3A shows the signature of a typical tuned air gun array.
Figure 3B:
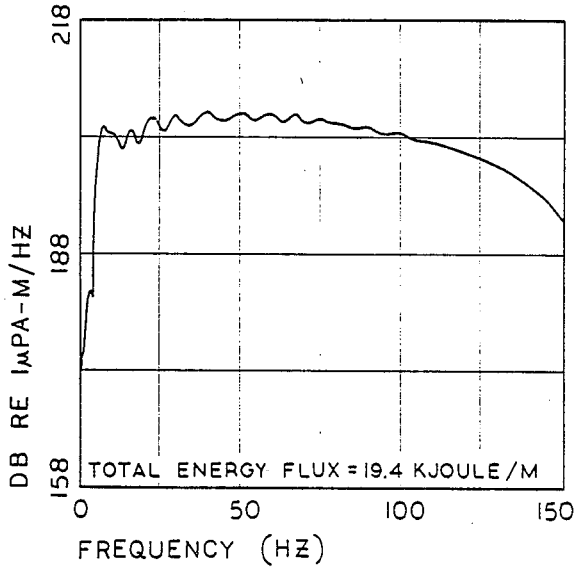
FIG. 3B shows the frequency spectrum of a typical tuned air gun array.

FIG. 3A is a computer generated signature of a typical tuned air gun array. The signature of FIG. 3A is representative of twenty air guns of varying sizes fired simultaneously at a water depth of 15 meters with an initial firing pressure of 4500 pounds per square inch, and having a total volume of 1500 cubic inches. FIG. 3B shows the frequency spectrum corresponding to the signature shown in FIG. 3A. "Tuning" of an air gun array is accomplished by selection of air gun sizes and sometimes the spacing between the air guns. Methods of tuning air gun arrays are well known to those of ordinary skill in the art.

It is an object of this invention to concentrate the energy in a selected lower portion of the frequency spectrum. Energy is attenuated in the range above the selected frequency by activating a plurality of sources asynchronously within a time window of selected duration. The duration of the time window is selected to be substantially equal to one-half the period of frequency below which it is desired to concentrate the energy. In a preferred embodiment of the present invention, a plurality of air guns are utilized, of which substantially half are fired asynchronously within a first time window and substantially half are fired asynchronously within a second time window. For example, if the firing times are spread over a window of 12 milliseconds, then from the formula $$f = 1/2\Delta t$$

where f = frequency, and $\Delta t$ = the time window, frequencies above $2(1/.012 \text{ sec.}) = 41.7$ Hz will be attenuated and frequencies below 41.7 Hz will be enhanced.

Figure 4A:
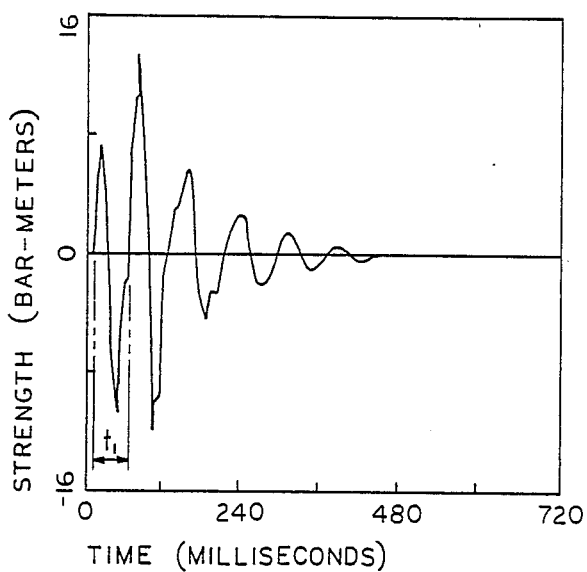
FIG. 4A shows the signature of an air gun array according to the invention described herein.
Figure 4B:
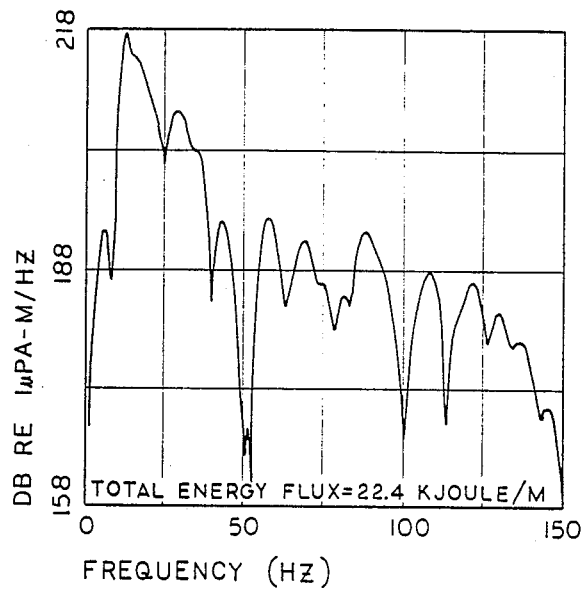
FIG. 4B shows the frequency spectrum of an air gun array according to the invention described herein.

FIG. 4A is a computer generated signature of a seismic source array operated in accordance with a preferred embodiment of this invention and FIG. 4B shows the corresponding frequency spectrum. In this particular preferred embodiment, eithteen air guns, each having a volume of 100 cubic inches are utilized. The guns are deployed at a water depth of 15 meters and have an initial firing pressure of 4500 pounds per square inch. The guns are fired asynchronously, spaced over a time window of 12 milliseconds. Attenuation of frequencies in FIG. 4B above about 41.7 Hz compared to the spectrum of a conventional tuned array shown in FIG. 3B is evident. Frequencies above about 40 Hz have about 15 dB less amplitude in FIG. 4B than in the frequency spectrum of a conventional tuned array shown in FIG. 3B.

Seismic energy may be concentrated about a selected frequency by appropriate selection of the air gun size, the water depth at which the guns are fired, and the initial firing pressure. These parameters are well known to those of ordinary skill in the art and do not need to be discussed herein. As stated previously, the energy from air guns will be concentrated at the frequency of the bubble pulse oscillations and the harmonics thereof, and there will be undesirable notches in the spectrum between the fundamental frequency and the harmonics of the bubble pulse oscillation. In FIG. 2B, peak 1 is at the fundamental frequency of the bubble oscillation, and peaks 2 and 3 are at the first and second harmonics of the bubble pulse oscillation frequency.

It is an additional object of this invention to smooth the peaks at the harmonic frequencies. In a preferred embodiment of the invention, the peaks at the first and second harmonic frequencies are attenuated by firing a second plurality of air guns at a delay from the firing times of the first plurality of air guns by a time period related to the period of the bubble pulse period. More specifically, the beginning of the time window within which the second plurality of air guns is fired is delayed from the beginning of the time window within which the first plurality of air guns is fired by the time between the initial firing of an air gun and the time of the first positive zero-crossing of the signature, which is the time of the first onset of the bubble pulse. This time period is shown in FIG. 4A as the time period, $t_1$. The second plurality of air guns may preferably include substantially the same number of air guns as the first plurality of air guns.

For any particular embodiment of the invention, the signature of the air guns fired within the first time window will need to be determined. Methods of determining seismic source signatures, either through direct measurement or by computer simulation, are well known to those of ordinary skill in the art.

Figure 5:
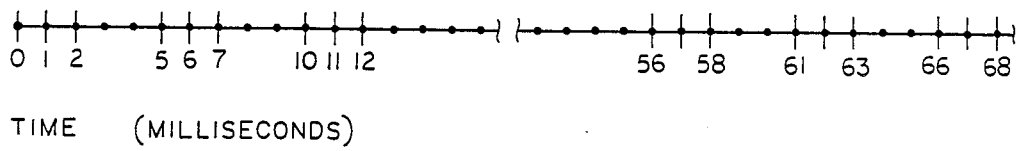
FIG. 5 shows the timing sequence for the firing of a source array in accordance with a particular embodiment of the invention.

In the particular embodiment of the invention, in which 18 air guns are utilized, the firing times were selected as illustrated in FIG. 5. The delay between the firing of the first gun in the first time window and the firing of the first gun in the second time window is 56 milliseconds. Nine of the air guns are fired within the first time window, with the individual air guns being fired sequentially at a time spacing of 0, 1, 2, 5, 6, 7, 10, 11 and 12 milliseconds. The firing of the other guns is delayed and fired respectively at a time delay of 56, 57, 58, 61, 62, 63, 66, 67 and 68 milliseconds. It can be observed that compared to the conventional tuned array of FIG. 3B, the frequency spectrum of FIG. 5B has about 15 dB more amplitude at 12 Hz.

More than or less than nine air guns may be fired within a time window. Normally, if fewer guns are used, less attenuation will be achieved at higher frequencies where attenuation is desired. Computer simulated studies have determined that significant attenuation of such higher frequencies is achieved with as few as four sources, although better attenuation is achieved if more sources are used.

The firing sequence utilized for a particular implementation of the invention may vary. Variations in the firing pattern will produce different amounts of attenuation and spectrum smoothing. Fine tuning to determine the best firing pattern may be achieved by computer simulation or by actual experimentation. Methods of performing such fine tuning are well known to those of ordinary skill in the art. Normally, sources will be fired individually at substantially uniform intervals within the time window.

Figure 6:
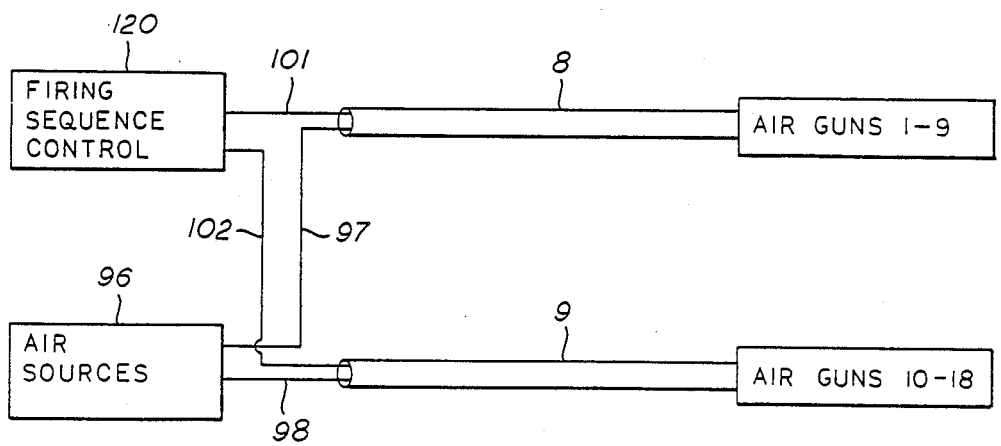
FIG. 6 shows a block diagram of the control system for utilizing the invention.

Apparatus for controlling the firing times of air guns is commercially available and will not be described herein. The firing control system for the source system shown in FIG. 1 is shown, generally, in FIG. 6. Electrical signal bus lines 101 and 102 from Firing Sequence Control 120, as well as pneumatic lines 97 and 98 from air sources 96, are included within integrated cables 8 and 9 respectively, which respectively tow floats 14 and 15. Cable 8 includes the electrical bus line and pneumatic lines for air guns 1–9. Cable 9 includes the electrical bus line and pneumatic lines for air guns 10–18. The Firing Sequence Control unit 120 may comprise an LRS-100 Energy Source Synchronizer from Litton Resources Systems, a division of Western Geophysical Company of America, located in Alvin, Tex.

Although specific ways and means for practicing the invention have been described herein and illustrated in the accompanying drawings, it is nevertheless to be understood that this has been done for purposes of illustration only and the scope of the invention is not limited thereby but is determined from the appended claims.

I claim:

1. A method of generating a seismic signal, in which the energy in said signal is concentrated at frequencies less than a selected frequency, comprising:
    firing a first plurality of seismic sources asynchronously, said firing times being distributed over a time window substantially equal to one-half the period of said selected frequency; and
    firing a second plurality of marine sources within a second time window, said second time window having a time delay relative to said first time window substantially equal to the time between the firing of the first one of the sources included in the first said plurality of sources and the onset of the bubble pulse.

2. The method of claim 1 wherein said sources are fired individually at substantially uniform time intervals within said time window.

3. The method of claim 1 wherein said plurality of sources comprises at least four sources.

4. The method of claim 1 in which said sources are air guns.

5. The method of claim 1 wherein said second time window is substantially equal to the first said time window.

6. The method of claim 5 wherein the number of sources included in the first and plurality of sources is at least four.

7. The method of claim 6 wherein the number of sources included in said second plurality of sources is equal to the number of sources included in the first said plurality of sources.

8. The method of claim 6 wherein said sources are air guns.

9. The method of claim 8 wherein all said air guns release substantially the same volume of air.

* * * * *